Figure 1:
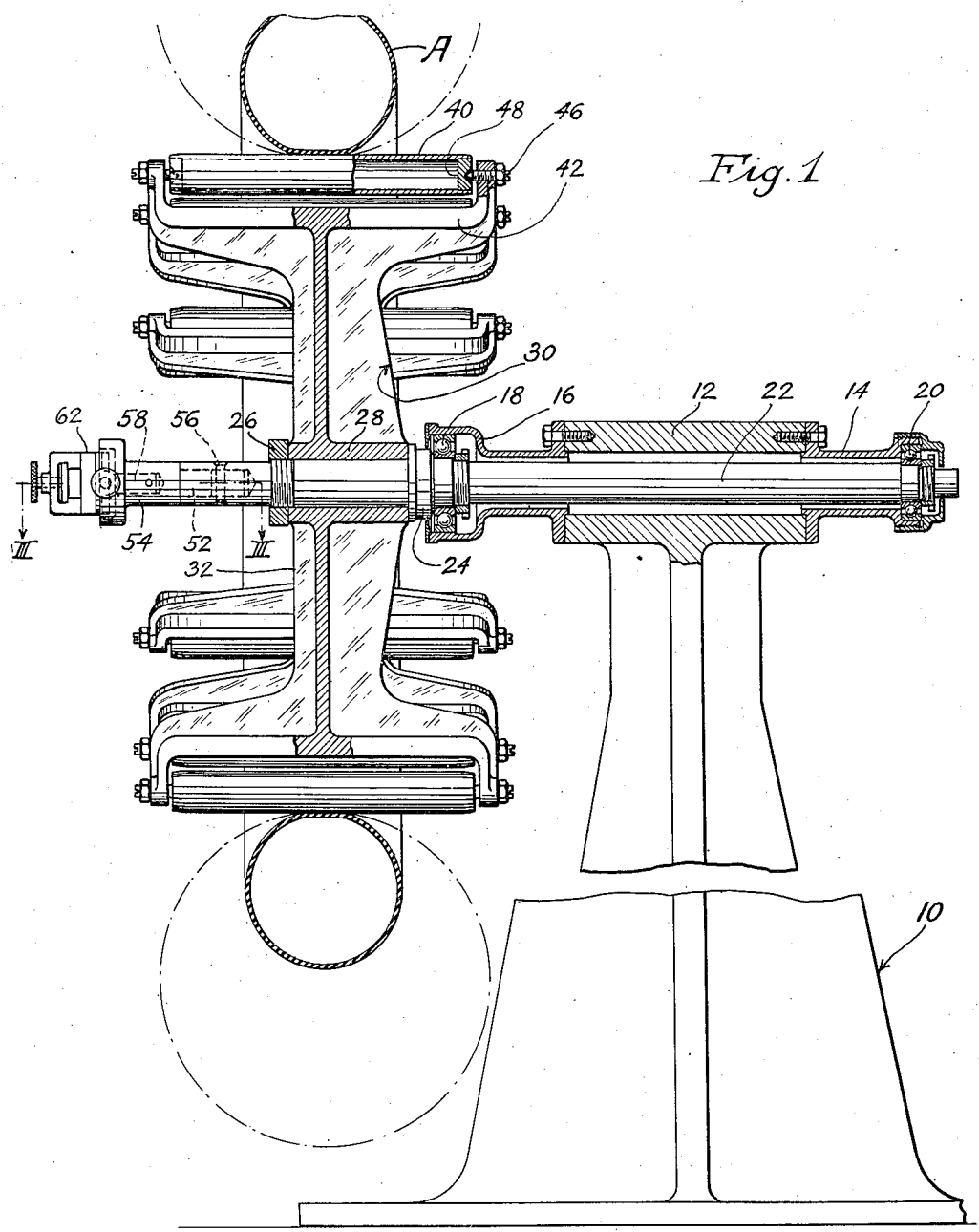

May 1, 1945. J. TORREY 2,375,171
BALANCING APPARATUS
Filed July 7, 1942 2 Sheets-Sheet 1

Inventor
Joseph Torrey
By
Attorney

May 1, 1945.  J. TORREY  2,375,171
BALANCING APPARATUS
Filed July 7, 1942  2 Sheets-Sheet 2

Inventor
Joseph Torrey
By
Attorney

Patented May 1, 1945

2,375,171

UNITED STATES PATENT OFFICE 2,375,171

BALANCING APPARATUS

Joseph Torrey, Akron, Ohio, assignor to Wingfoot Corporation, Akron, Ohio, a corporation of Delaware Application July 7, 1942, Serial No. 449,985

1 Claim. (Cl. 144—288.1)

The present invention relates to apparatus for balancing ring-shaped articles, and, particularly, toroidal and like objects, such as rubber inner tubes, and the invention further relates to mechanism for weighing the amount of out of balance of any objects tested on the apparatus.

Heretofore, various types and forms of balancing apparatus have been suggested for use in conjunction with the balancing of rubber tires, inner tubes, and the like. Many of these apparatus have proven quite satisfactory, particularly for balancing pneumatic tires, but I have found that with apparatus and methods of known character, the proper and correct balancing of rubber inner tubes is sometimes difficult, due to difficulties in properly mounting and supporting such inner tubes on the usual supporting elements of known balancing apparatus. Further, I have found that many balancing apparatus do not provide easily operated and accurate means for determining the amount of out of balance of the object or article being tested.

It is the general object of my invention to avoid and overcome the foregoing and other objections to and difficulties of known forms of article balancing apparatus by the provision of improved mechanisms for rapidly and accurately balancing inner tubes and other toroidal or ring-shaped articles, with such apparatus being relatively inexpensive, long-wearing, and easily operated.

Another object of my invention is to provide improved apparatus for balancing toroidal and like objects, and including relatively frictionless means for engaging and supporting the article to be balanced so that the article will distribute itself substantially uniformly on the balancing apparatus and a very accurate balancing operation will result.

Another object of my invention is the provision of inexpensive, relatively simple, easily operated apparatus for balancing inner tubes and the like, and including means for measuring the amount of out of balance of the article being tested.

The foregoing objects of my invention, and other objects, which will become apparent as the description proceeds, are achieved by the provision of apparatus for balancing inner tubes and like articles, and including a wheel, a plurality of rolling means journaled on the periphery of the wheel and adapted to engage and support an article to be balanced, and means for rotatably supporting the wheel for movement about its axis. A scale is ordinarily releasably secured to the wheel for measuring the amount of out of balance of the article.

Figure 2:
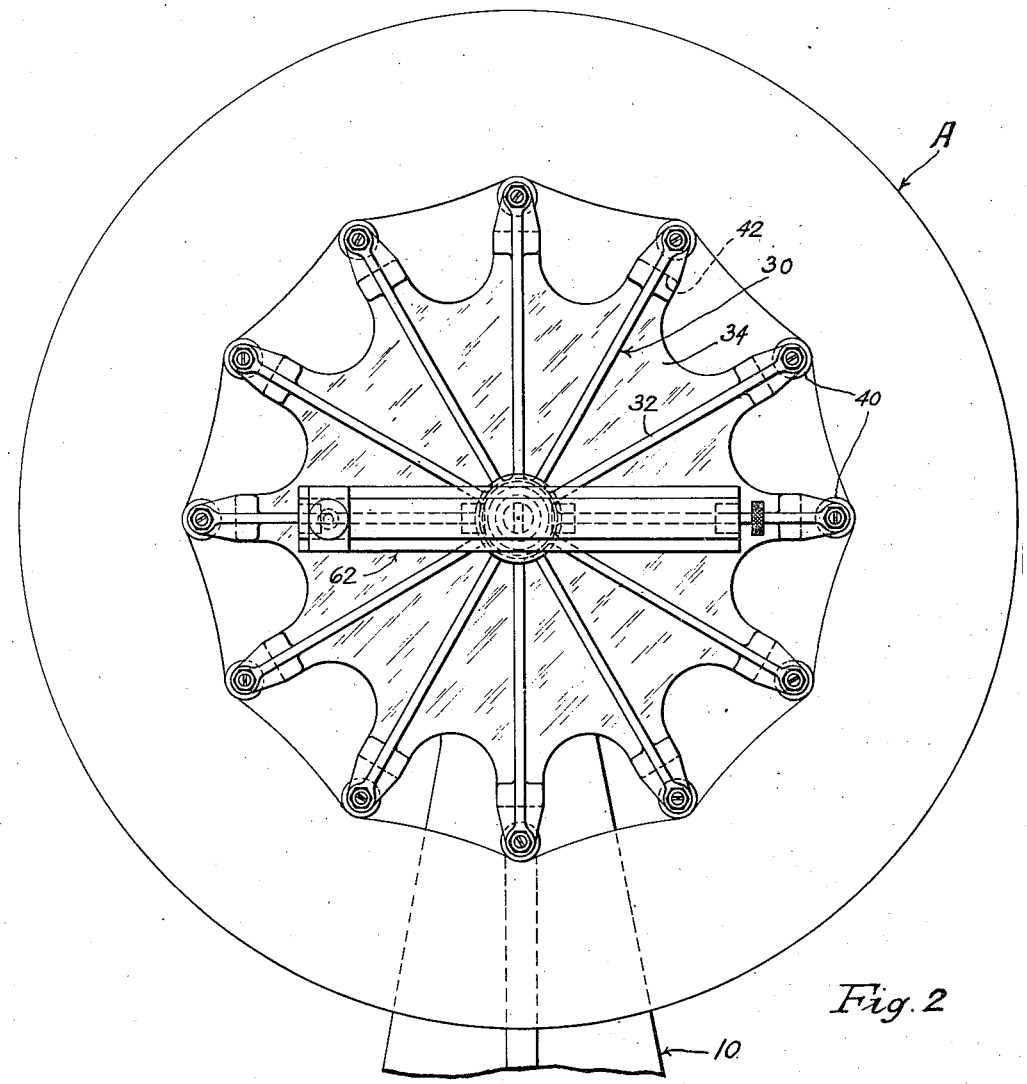
Figure 3:
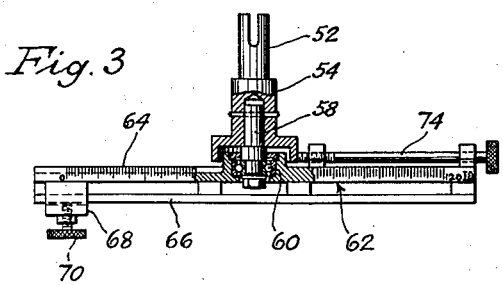

For a better understanding of my invention, reference should be had to the accompanying drawings, wherein Fig. 1 is a side elevation, partly in section, of a balancing apparatus incorporating the principles of my invention; Fig. 2 is a front elevation of the upper portion of the apparatus illustrated in Fig. 1; and Fig. 3 is a fragmentary sectional view of the scale mechanism incorporated with the balancing apparatus and taken substantially on line III—III of Fig. 1.

In the drawings, the numeral 10 indicates an upstanding base having an integral hub portion 12 provided at its upper end, with the hub portion 12 having circular bearing brackets 14 and 16 secured thereto and carrying anti-friction ball bearings 18 and 20 which journal a shaft 22 substantially on a horizontal axis. The shaft 22 includes a shoulder or collar portion 24 against which a collar 26 secures the hub 28 of a wheel spider, indicated as a whole by the numeral 30. The wheel spider 30 may obviously take a plurality of forms, but generally includes a plurality of radially-directed spokes 32 in the form of substantially flat flanges which are connected together by flanges 34 to provide a relatively strong and rigid wheel spider.

Mounted on the periphery of the wheel spider 30 are a plurality of rolling means adapted to provide a relatively frictionless or anti-friction support for an article or object, such as an inner tube A, adapted to be tested upon the apparatus. The rolling means have been illustrated as including a plurality of rollers 40 which are mounted with their axes parallel to the axis of the shaft 22 and in circumferentially-spaced positions on the periphery of the wheel spider 30. Conveniently, the spoke flanges 32 are increased in axial length adjacent the periphery of the wheel spider and support U-shaped bearing brackets 42 having radially-directed sides receiving pointed screws 46 which engage in conical recesses formed in plugs 48 carried at the ends of the rollers 40, as will be evident from a consideration of Fig. 1 of the drawings. Obviously, the exact means for journalling the rollers 40 on the periphery of the wheel spider 30 may take a plurality of forms, and the rollers 40 may comprise substantially any means providing a rolling support for the article being tested, and so that the article will have substantialy frictionless support on the periphery of the wheel spider for rotary movement substantially about the axis of the wheel spider.

The end of the shaft 22 is provided with a socket which receives a forked spindle 52 formed integrally with a cup 54, and with the spindle 52 being locked to the shaft 22 by any suitable means, such as a rivet 56 extending through the forked end of the spindle 52. The cup 54 has a pin 58 secured axially therein, and the pin 58 carries on a frictionless bearing 60 a scale arm indicated as a whole by the numeral 62.

The scale arm 62 includes a graduated scale portion 64, a parallel weight supporting rod 66, and a weight 68 slidably mounted upon the rod 66 and adapted to be locked on to the rod 66 by a thumb screw 70. A rod 74 secured to the back of the scale arm 62 is adapted to be turned and clamped against the cup 54 so as to lock the scale arm 62 in engagement with the cup 54. With the weight 68 positioned as shown in Fig. 3, the entire scale arm 62 is balanced about the bearing 60.

It is believed that the operation of the apparatus embodiment of my invention illustrated and described will be completely evident from the foregoing description. Suffice it to say that an article A of substantially any cross-sectional diameter and of an internal bead-to-bead diameter substantially equal to the external diameter of the wheel spider assembly is slipped on to the rollers 40 defining the periphery of the wheel spider. Any inequality or stress within the body of the article A between adjacent or any of the rollers 40 will be readily compensated for by the free rolling movement of the rollers 40. In other words, if a certain arcuate portion of the article A is stretched during the application of the article to the wheel spider, the stretch in the article will be rendered uniform circumferentially of the article by the turning of one or more of the rollers 40.

With the article A mounted in a completely uniform manner on the wheel spider, the complete wheel spider will turn together with the shaft 22 in the bearings 18 and 20 to bring the heavy portion of the article A to the lowest point of turning movement of the wheel spider. During the time that the wheel spider 30 is turning to allow the heaviest side of the article A to move to the bottommost position, the rod 74 is turned so that the scale arm 62 is not carried with the shaft 22. However, once the heaviest part of the article A has moved to the lowermost position, then the scale arm 62 is moved to a vertical position with the weight 68 at the bottom and the rod 74 is turned to clamp the scale arm securely to the cup 54, shaft 22, and wheel spider 30. Now, if the operator swings the heaviest bottom portion of the article A through 90° to position it, say to the extreme left side of Fig. 2 of the drawings, and then moves the weight 68 towards the right along the scale 64 until a balance is achieved, then the amount of out of balance of the article being tested can be read directly from the scale 64.

From the foregoing, it will be recognized that the objects of my invention have been achieved by the provision of a relatively inexpensive, easily operated, long-lived balancing apparatus for measuring the amount of out of balance of toroidal or other objects, with the apparatus being particularly characterized by the use of rolling or anti-frictional means between the article being tested and the supporting wheel incorporated in the apparatus, whereby any difference in circumferential stress throughout the entire article being tested is totally eliminated.

Although I have particularly described my invention in conjunction with a rotatable wheel spider or member mounted for rotary movement about substantially a horizontal axis, it should be particularly noted that many of the advantages of my invention are retained even though the wheel member should be mounted on a vertically-extending pointed pivot with a rocking of the wheel member out of a horizontal plane during the balancing operation.

Although, in accordance with the patent statutes, I have specifically illustrated and described one embodiment of my invention, it should be understood that I am not to be limited thereto or thereby, but that the scope of my invention is defined in the appended claim.

What I claim is:

Apparatus for balancing inner tire tubes, including a wheel, a plurality of rolling means, substantially frictionless bearings journaling the rolling means on the periphery of the wheel and adapted at a plurality of points in each quadrant to engage and support a tire tube to be balanced for substantially frictionless movement about the exact axis of the wheel, and means rotatably supporting the wheel for rotation about its axis, said means supporting the wheel axis substantially horizontal, the outer diameter of the wheel being slightly larger than the inner diameter of the tube to be balanced, to hold the tire tube in a stretched relation and prevent its turning relative to the wheel member, said rolling means equalizing the stresses set up in said tire tube due to stretching.

JOSEPH TORREY.